April 29, 1958

U. HÜTTER 2,832,895

CONTROL APPARATUS FOR WIND MOTORS

Filed Jan. 31, 1956

INVENTOR
ULRICH HUTTER

BY Michael S. Striker

ATTORNEY

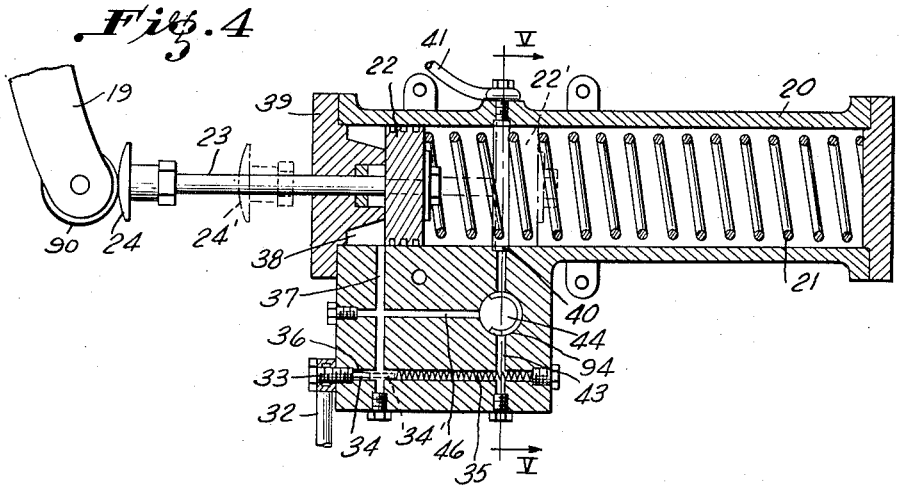
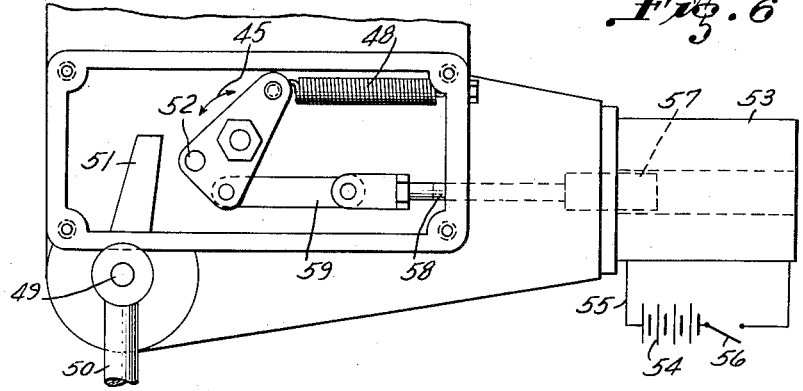
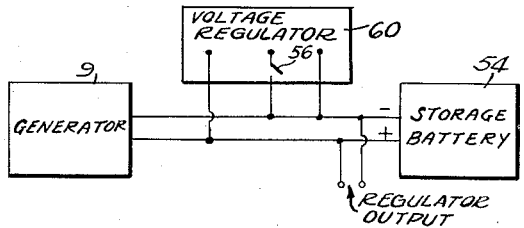
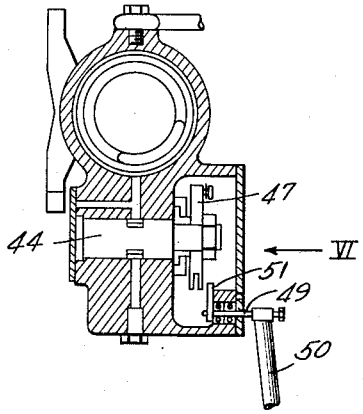

United States Patent Office 2,832,895
Patented Apr. 29, 1958

2,832,895

CONTROL APPARATUS FOR WIND MOTORS

Ulrich Hütter, Kirchheim (Teck), Germany, assignor to Allgaier-Werke G. m. b. H., Uhingen, Wurttemberg, Germany Application January 31, 1956, Serial No. 562,522

15 Claims. (Cl. 290—44)

The present invention relates to wind motors and more particularly to control devices for wind motors.

With conventional wind motors the blades of the wind wheel are capable of having their pitch changed in order to regulate the energy which is taken from the wind. Devices are provided for automatically regulating the pitch of the blades, but particular difficulty is involved in providing the best possible blade pitch when the wind wheel starts to turn and is turning at an extremely small speed because of the small amount of energy which is capable of being derived from the wind wheel at this time for controlling the pitch of the blades thereof. Furthermore, difficulties are involved in controlling the pitch of the blades in response to various impulses such as the charge of a battery or sudden gusts of wind.

One of the objects of the present invention is to provide a control apparatus capable of automatically providing the blades of a wind wheel with the best possible pitch at the time when the wind wheel is stationary and is just starting to turn.

Another object of the present invention is to provide a control apparatus which is capable of automatically regulating the blade pitch of the wind wheel in response to such impulses as a predetermined charge on a battery or sudden gusts of wind.

A further object of the present invention is to provide a control apparatus having manually operable parts, which are capable of being operated at the will of the operator for changing the pitch of the blades.

An additional object of the present invention is to provide an arrangement where the pitch of the blades is automatically changed to a position where very little if any energy is taken from the wind when something goes wrong with the wind motor.

Also, the objects of the present invention include structure capable of accomplishing all of the above objects and at the same time being exceedingly simple and rugged and very reliable in operation.

With the above objects in view the present invention mainly consists of a wind motor which includes a support means and a wind wheel carried for rotation about its axis by the support means and including a hub portion and a plurality of blades extending radially from the hub portion and carried for rotation about their axes, respectively, by the hub portion, so that the pitch of the blades can be changed. A pitch changing means is operatively connected to the blades and movable in one direction for changing the pitch in one direction and an opposite direction for changing the pitch in an opposite direction. A pair of energy storing means of different strengths act on the pitch changing means in different directions for tending to change the pitch in different directions, respectively. A means driven by the rotating wind wheel is operatively connected to the stronger of the energy storing means for eliminating the influence thereof on the pitch changing means during operation of the wind motor, and automatic controls responsive to a plurality of different impulses are interconnected with the means which act on the stronger of the energy storing means for allowing the latter to act on the pitch changing means when any one of a plurality of different events occur.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is a fragmentary partly sectional elevational view of an energy storing means of the invention and the structure associated therewith, Fig. 4 being taken along line IV—IV of Fig. 2 in the direction of the arrows and being on an enlarged scale with respect to Fig. 2;

Fig. 5 is a sectional view taken along line V—V of Fig. 4 in the direction of the arrows;

Fig. 6 is a fragmentary elevational view on an enlarged scale of the structure of Fig. 5 as seen in the direction of arrow VI of Fig. 5;

Fig. 7 is a diagrammatic illustration of the manner in which the charge of a storage battery may be used to automatically control the wind motor of the invention.

Figure 1:
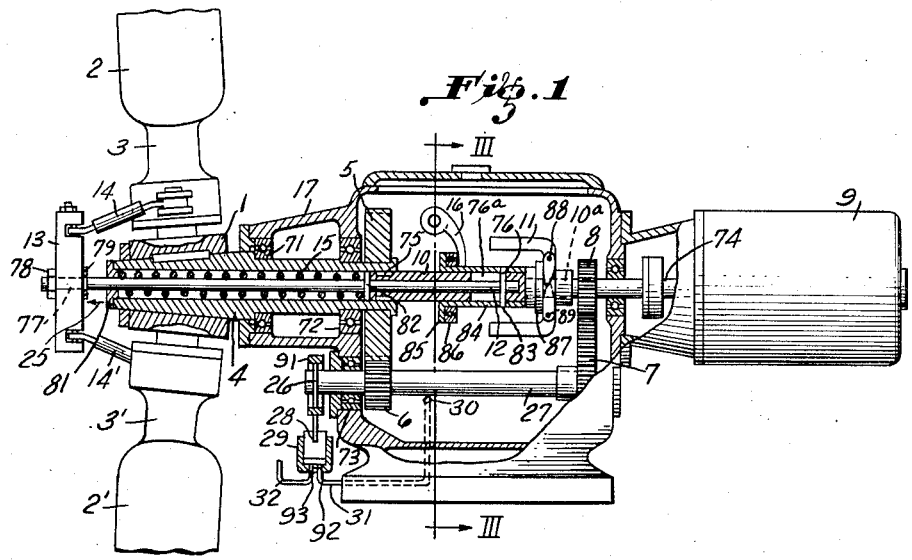
Fig. 1 is a partly broken away, partly sectional side elevational view of the head part of a wind motor according to the present invention.

Referring now to the drawings, the structure shown therein is the head or upper part of a wind motor according to the present invention. The structure which is shown in the drawings is set at the top of a tower which carries this structure, and with an unillustrated adjusting structure it is possible in a known way to angularly adjust the structure shown in the drawings about a vertical axis so as to orient the wind motor with respect to the wind direction. The wind motor shown in the drawing may be oriented with respect to the wind in an automatic manner with an auxiliary wind motor which is not illustrated.

Figure 2:
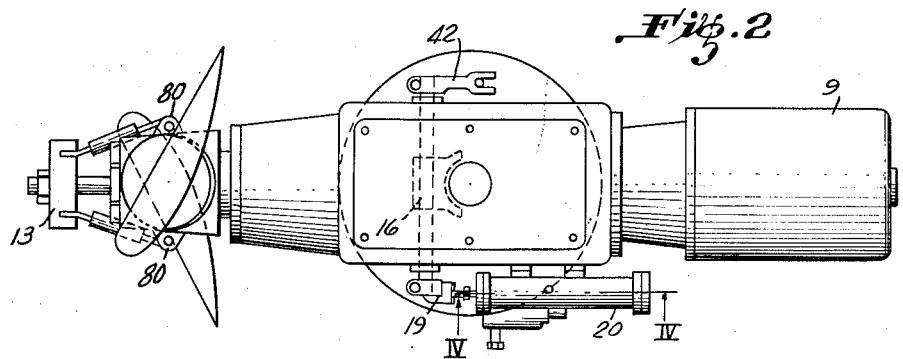
Fig. 2 is a plan view of the wind motor of Fig. 1.

As may be seen from Figs. 1 and 2, the wind motor includes a wind wheel made up of a hub portion 1 and a pair of blades 2, 2' which extend radially from the hub portion 1 and which are carried for rotation about their axes 3, 3', respectively, by the hub portion 1. Thus, it is possible to change the pitch of the blades 2, 2'. The hub portion 1 is supported for rotation about its axis by a support means which includes the hollow shaft 4 on which the hub portion 1 is fixed and the bearings 71, 72 shown in Fig. 1 as supporting the hollow shaft 4 for rotation about its axis. These bearings are carried by the frame or housing 17 of the wind motor from which the hollow shaft extends to the left, as viewed in Fig. 1, and this housing forms part of the support means which supports the wind wheel for rotation about its axis. The hollow shaft 4 is fixed at its end which is in the interior of the housing 17 to a gear 5 which in turn meshes with a gear 6 fixed to a shaft 27 which is supported for rotation about its axis by suitable bearings 73, carried by the housing 17. The shaft 27 also carries a gear 7 which meshes with another gear 8, so that elements 5—8 form a gear train for transmitting the drive from the wind wheel to the gear 8. This gear 8 is fixed to the shaft 74 of a generator 9, so that in this way the generator 9 is driven by the wind motor, and this generator 9 may be used to charge a storage battery, for example, as will be apparent from the description which follows.

The gear 8 is also fixed to the right end portion 10a of a hollow shaft 10 which turns with the gear 8 and which extends at its left end portion, as viewed in Fig. 1, into the hollow shaft 4 where this left end portion is supported by suitable bearings 75 for rotation with respect to the hollow shaft 4, so that the shafts 4 and 10 are free to turn with respect to each other. A rod 12 which forms part of a means for adjusting the pitch of the blades 2, 2' extends slidably along an axial bore of the shaft 10, and a transverse pin 76 shown at the right end portion of the rod 12, as viewed in Fig. 1, extends from the rod 12 through axially extending slots 76a formed in the hollow shaft 10, this pin extending radially beyond these slots 76a, as evident from Fig. 1. The rod 12 extends to the left beyond the hollow shaft 4 freely through an opening 77 in a bar 13, so that the rod 12 is freely turnable with respect to this bar 13. A nut 78 carried by the left free end portion of the rod 12, as viewed in Fig. 1, and a collar 79 fixed to the rod 12 just to the right of the bar 13, as viewed in Fig. 1, compel the bar 13 to shift axially with the rod 12. However, this nut and collar do not prevent free rotation of the rod 12 about its axis with respect to the bar 13. Links 14 interconnect the bar 13 with eccentrically located portions 80 of the blades 2, 2' as indicated in Figs. 1 and 2, so that as the bar 13 is shifted axially to the left or right, as viewed in Fig. 1, the blade pitch will be changed.

Within the hollow shaft 4 there is a coil spring 15 which forms an energy storing means, which bears at its left end, as viewed in Fig. 1, against a cover 81 at the end of the hollow shaft 4 through which the rod 12 freely extends, and which bears at its right end, as viewed in Fig. 1, against a thrust bearing 82 which is fixedly carried by the rod 12, this spring 15 being coiled about the rod 12, in the manner indicated in Fig. 1. Thus, the spring 15 urges the rod 12 to the right, as viewed in Fig. 1, and by engaging the thrust bearing 82 at the right end of the spring 15, the rod 12 is free to turn without turning the spring 15. The spring 15 urges the rod 12 of the pitch changing means 12—14, 14' in a direction which causes the pitch of the blades to increase so that the spring 15 changes the pitch in a direction which causes the blades to take an increasing amount of energy from the air.

The transverse pin 76 which extends through the right end portion of the rod 12 and through the axial slots 76a of the shaft 10 extend into a pair of axial slots 83 formed in a sleeve 84 which is freely slidable on the shaft 10 and which is provided at its left end with an outwardly extending flange 85 forming part of a thrust bearing 86 engaged by the fork 16 at the right side of the thrust bearing, as viewed in Fig. 1. The sleeve which is slidable on the shaft 10 is provided at its right end with an outwardly extending annular flange 87 which is engaged by a pair of flyweights 11 of a centrifugal governor which is fixed to the shaft 10. This centrifugal governor includes a sleeve fixed to the shaft 10 and formed with outwardly extending lugs 88, 89 on which the flyweights 11 are pivotally mounted, so that these flyweights 11 are free to turn under the influence of centrifugal force. The free ends of the flyweights 11 which extend across the axis of shaft 10, as viewed in Fig. 1, are located at opposite sides of the sleeve which carries the governor and engage opposite sides, respectively, of the right annular flange of the sleeve which is freely slidable on the shaft 10. Thus, when the flyweights 11 of the governor move outwardly through an angle resulting from an increasing speed of rotation of the shaft 10, there will come a time when the flyweights will shift the sleeve on shaft 10 to the left as viewed in Fig. 1, through a distance sufficient to cause the right ends of the slots in the sleeve to engage the transverse pin of the rod 12 so that the leftward movement of the sleeve is transferred to the rod 12 which is itself shifted to the left in order to compress the spring 15 and in order to reduce the pitch of the blades, so that in this way an automatic means is provided for decreasing the amount of energy which is taken from the wind. Thus, the governor 11 and the structure cooperating with the same prevents the wind motor from being driven at too high a speed.

Figure 3:
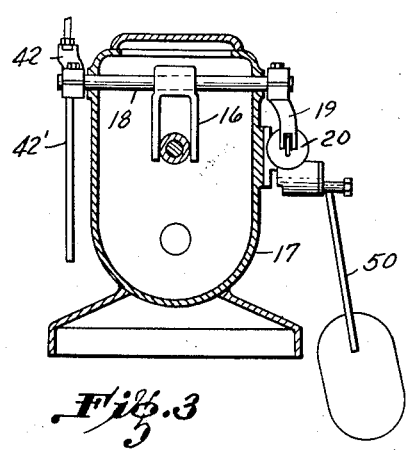
Fig. 3 is a transverse sectional view of the structure of Fig. 1 taken along the line III—III of Fig. 1 in the direction of the arrows.

The shifting fork 16 which is located within the housing 17 is fixed to a bar 18 which extends transversely through the housing 17, as shown in Fig. 3, and which is turnably carried for rotation about its axis by the side walls of the housing 17. This shifting fork engages the thrust bearing carried by the sleeve slidable on the shaft 10, as was pointed out above, so that when the shifting fork 16 is turned about the axis of bar 18 in a clockwise direction, as viewed in Fig. 1, the sleeve on shaft 10 will also be shifted to the left, as viewed in Fig. 1, to engage the transverse pin at the right end portion of rod 12 in order to shift the latter to the left and thus decrease the pitch of the blades.

The shaft 18 is fixed at its right end portion, as viewed in Fig. 3, at the exterior of housing 17 to a lever 19 which, as is shown most clearly in Fig. 4, carries at its lower free end a freely turnable roller 90 engaged by a pressure member 24 carried by the left end of a piston rod 23 which is fixed to a piston 22. The piston 22 is slidable within a cylinder 20 in which a second spring 21 which forms a second energy storing means is located. This second spring 21 is stronger than the spring 15, and in the solid line position of the parts shown in Fig. 4 the spring 21 locates the lever 19 and thus the fork 16 in a position which shifts the rod 12 to the left, in the direction of arrow 25 of Fig. 1, through a distance sufficient to reduce the pitch of the blades and provide these blades with a pitch which is most favorable for the starting up of the wind motor.

As is indicated in Fig. 1, the shaft 27 of the transmission in the housing 17 is fixed at its left free end portion, as viewed in Fig. 1, which extends outwardly beyond the housing 17 to an eccentric 26 which is freely turnable within a ring 91 which is connected to the piston rod of the piston 28. Thus, with this arrangement as the shaft 27 rotates about its axis the piston 28 is reciprocated up and down. The piston 28 reciprocates within a cylinder 29, so that the parts 28 and 29 form a pump which is driven by the wind motor. A conduit 31 supplies the pump with fluid, and this conduit 31 has an inlet end 30 located in the oil bath within the transmission housing 17 at an elevation which is at the lowest permissible elevation for the level of the oil bath for proper operation of the transmission. In other words when the level of the oil bath within the transmission housing 17 falls below the inlet end 30 of the conduit 31 then there is insufficient oil in the housing 17 to lubricate the elements in housing 17 properly. A non-return valve 92 is located in cylinder 29 and cooperates with the conduit 31 for compelling the oil to flow only into the cylinder 29 from the conduit 31. An outlet conduit 32 communicates with the cylinder 29 and another non-return valve 93 permits oil to flow only from the cylinder 29 into the conduit 32 during the pressure strokes of the piston 28.

As is shown in Fig. 4, a hydraulic means which includes the cylinder 20 communicates with the pump 28, 29 and with the piston 22 and spring 21 for controlling the latter elements. This hydraulic means includes the fitting 33 which communicates with the conduit 32 for guiding the oil from the latter into a conduit 36 in which a hydraulic relay member 34 in the form of a small bar is located for free movement to the right and left along the conduit 36 which extends horizontally, as viewed in Fig. 4. A coil spring 35 is located within the conduit 36 for urging the relay member 34 to the left, to the position indicated in Fig. 4. The conduit 36 communicates with a conduit 37 which leads into the head end 38 of the cylinder 20 at a part of the latter located to the left of the piston 22, as viewed in Fig. 4. The cylinder is closed at its left end by a plate 39 through which the piston rod 23 slidably extends in a fluid-tight manner. The cylinder 20 is further formed with an annular groove 40 communicating with a discharge conduit 41 which leads back to the oil bath in the transmission housing 17.

Thus, when the pump 28, 29 is operated during rotation of the wind wheel, oil under pressure will be pumped from the conduit 32, and this oil under pressure will shift the hydraulic relay member 34 to the right along the conduit 36 and across the conduit 37 until the relay member 34 is located in the conduit 36 in the position 34′ indicated in Fig. 4 just to the right of the conduit 37, the spring 35 being compressed by this shifting of relay member 34 to the right. The oil is then free to flow upwardly through the conduit 37, as viewed in Fig. 4, into the chamber 38 of the cylinder 20 so as to act on the piston 22 to shift the latter to the right until the parts reach the dotted line position indicated in Fig. 4 where the piston 22 is located in the position 22′ indicated in Fig. 4. In this position the oil in the chamber 38 communicates with the annular groove 40 and thus with the discharge conduit 41 so that the piston 22 shifts no further to the right. It will be noted that in this position of the parts the pressure member 24 is located in the dotted line position 24′ indicated in Fig. 4, and with the parts in this position the lever 19 and bar 18 do not cause the fork 16 to shift the rod 12 to the left, as viewed in Fig. 1 and thus at this time the rod 12 is under the influence of the coil spring 15 which in this manner automatically shifts the rod 12 to the right so as to increase the pitch of the blades of the wind wheel and thus enable the wind wheel to take the most energy out of the wind, the upper limit of this energy being controlled by the centrifugal governor which includes the flyweights 11, as has been pointed out above. Thus, it will be seen that the structure of the invention provides a pair of energy storing means 15 and 21 which act in opposed directions on the pitch changing means 12—14, 14′ to tend to change the pitch of the blades of the wind wheel in opposite directions, and when the wind wheel operates the stronger of the energy storing means 21 is automatically moved to a position where it has no influence on the pitch changing means by the pump means 28, 29 and the hydraulic means shown in Fig. 4.

In order to make it possible to manually reduce the pitch of the blades at the will of the operator, a lever 42 shown in Figs. 2 and 3 is fixed to the left free end portion of the bar 18, as viewed in Fig. 3, at the exterior of the housing 17. This lever 42 is linked at its right free end, as viewed in Fig. 2, to the top end of a rod 42′ which forms part of any suitable linkage which is not further illustrated in the drawings capable of being actuated by the operator so as to turn the shaft 18 about its axis in order to turn the shifting fork 16 in a clockwise direction, as viewed in Fig. 1, at the will of the operator to shift the rod 12 to the left, as viewed in Fig. 1, in order to reduce the pitch of the blades and thus reduce the energy which is taken from the wind. It is also possible with the elements 42 and 42′ to manually return the shifting fork 16 to a position where the rod 12 is acted on by the spring 15 to increase the pitch of the blades of the wind wheel.

As is shown in Fig. 4, the hydraulic means also includes a conduit portion 43 which is parallel to the conduit portion 37 and communicates with the annular groove 40 which leads to the discharge conduit 41. Thus, the conduit 43 forms part of the discharge conduit, and the conduit 36 communicates with the conduit 37 and the conduit 43. The hydraulic means includes a valve means 44 in the form of a cylinder supported by the block formed with the bores which form the conduits 37, 36, and 43, this cylinder 44 being supported for rotation about its axis and being formed in its outer cylindrical face between its ends with a groove 94 which extends only part way about the cylinder 44, as indicated in Fig. 4. Thus, the cylinder 44 forms a valve means. A by-pass conduit portion 46 by-passes the conduit 35 and interconnects conduit 37 with the conduit 43, and in the position of the valve means 44 indicated in Fig. 4 the arcuate groove of the valve means 44 is located out of line with the conduit 46 so that the latter is out of communication with the conduit 43. However the portions of the conduit 43 located above and below the valve means 44, as viewed in Fig. 4, communicate with each other through the arcuate groove in the valve means 44. The hydraulic relay member 34 has a clearance in the bore 36 so that even when the relay member 34 is in the dotted line position 34′ indicated in Fig. 4 a small amount of oil continually leaks past the relay member 34 into the conduit 43 to move along the latter to the groove 40 and to the discharge conduit 41.

Assuming that the valve means 44 remains in the position indicated in Fig. 4 and that the pump means 28, 29 continues to pump as a result of the operation of the wind motor, the relay member 34 will remain in the position 34′ and the piston 22 will remain in the position 22′. However if there is a time where very little wind blows or if the pitch of the blades is reduced to its smallest value by manual actuation of the pitch changing means, as described above, then the pump 28, 29 will stop pumping oil into the conduit 37. Thus, the pressure at the left end face of the relay member 34 will drop and the force of the spring 35 will automatically shift the relay member 34 from the position 34′ of Fig. 4 back to the solid line position of the member 34 indicated in Fig. 4. In this way the conduit 36 will provide direct communication between the conduit 37 and the conduit 43, and thus the oil in the chamber 38 will be capable of flowing with very small resistance back into the discharge conduit 41. As a result, the spring 21 will resume its solid line position indicated in Fig. 4 at an accelerated rate and thus, the pressure member 24 will act on a lever 19 to turn the shifting fork 16 in a clockwise direction, as indicated in Fig. 1, so as to automatically reduce the pitch of the blades of the wind wheel in this manner. It will be noted that oil also will not be pumped to the conduit 37 if the oil level in the housing 17 falls below the inlet 30 of the conduit 31, so that at this time also the relay member 34 will be returned to its solid line position indicated in Fig. 4, and thus the pitch of the blades will be automatically reduced when the oil level is too low. In this way an automatic safety device is provided for preventing operation of the wind motor when the oil level is too low to provide proper lubrication for the structure within the housing 17.

It will be noted from Fig. 4 that if the control means in the form of valve 44 is turned in a counterclockwise direction, as viewed in Fig. 4, through between 45 and 90°, for example, the portion of conduit 43 below the valve 44 will no longer communicate with the portion of conduit 43 above the valve 44, and instead the by-pass conduit portion 46 will communicate directly with the conduit portion 43 so that with the valve means 44 in this position oil under pressure in the chamber 38 will immediately flow back through conduit 37 and through conduit portion 46 to the conduit portion 43 above the valve 44, as viewed in Fig. 4, and then to the groove 40 and the outlet passage 41 back to the oil bath in the housing 17. Thus, by turning the valve 44 in a counterclockwise direction, as viewed in Fig. 4, it is possible to cause the spring 21 to expand and reduce the pitch of the blades. In accordance with the present invention a structure is provided for turning the valve 44 from the position of Fig. 4 to a position where it provides communication between by-pass conduit 46 and conduit 43 in response to any one of a number of different impulses. As is apparent from Figs. 5 and 6, the right free end portion of the valve member 44, as viewed in Fig. 5, has a lever 47 fixed thereto, the valve member 44 being fixed to the lever 47 between the ends of the latter. As is apparent from Fig. 6, a spring 48 is connected at one end to the lever 47 and at its opposite end to a stationary part of the housing shown in Fig. 6 in order to urge the lever 47 and the valve 44 therewith in a clockwise direction, as viewed in Fig. 6, and the spring 48 retains the valve 44 in the position indicated in Fig. 4 where the by-pass conduit 46 no longer communicates with the conduit 43. To the opposite end of the lever 47 is linked a member 59 which is in turn linked through an elongated member 58 to the armature 57 of a solenoid which includes the coil 53. The coil 53 may be energized in any suitable way such as with the electrical circuit 55 indicated diagrammatically in Fig. 6, this circuit 55 including the coil 53, the source of current 54, and the switch 56. Thus, it will be evident that whenever the switch 56 is closed, the solenoid will be energized to shift the armature 57 to the right, as viewed in Fig. 6, and thus turn the lever 47 together with the valve means 44 in a counterclockwise direction, as viewed in Fig. 6, and in this way the by-pass conduit portion 46 is placed in communication with the conduit portion 43, so that whenever the switch 56 is closed the oil pressure in the chamber 38 will drop, the spring 21 will expand, and the pitch of the blades of the wind wheel will be reduced. Thus, it is possible in an electrical manner to call the spring 21 into play at any desired moment, and an operator at any considerable distance from the wind motor may have a switch which is accessible and connected electrically to the coil 53 for reducing the blade pitch at any desired time.

It is also possible to reduce the pitch of the blades automatically in response to a particular charge of a battery, and Fig. 7 diagrammatically illustrates an arrangement capable of accomplishing this result. Thus, referring to Fig. 7, it will be seen that the generator 9 is shown diagrammatically connected electrically with a voltage regulator 60 which is in turn connected electrically with a storage battery 54 charged by the generator 9. The switch 56 is connected electrically with voltage regulator 60 so that in a known way this voltage regulator will close the switch 56 whenever the charge of the battery 54 reaches a predetermined value. Thus, with this arrangement it is possible to automatically reduce the pitch of the blades of the wind motor and stop the operation thereof whenever the battery 54 has become charged sufficiently, and thus it is impossible to overcharge the battery 61.

The lever 47 has a pin 52 fixed thereto and extending therefrom in a direction parallel to the turning axis of the lever 47 and valve means 44. The pin 52 is located in the path of movement of a member 51 which is fixed to a shaft 49 supported for rotation about its axis. The shaft 49 is in turn fixed to a member 50 which is sensitive to the dynamic pressure of the wind. Thus, if there is a sudden gust of wind of too great force or if the wind should turn the wind motor momentarily, for example, at too great of a speed, the member 50 will be turned by the wind in a clockwise direction, as viewed in Fig. 6, to cause the arm 51 to engage the pin 52 and turn the lever 47 in a counterclockwise direction, as viewed in Fig. 6, so as immediately to turn the valve 44 in a counterclockwise direction, as viewed in Fig. 4, in order to place by-pass conduit 46 and conduit portion 43 in communication with each other to immediately call the spring 21 into play for reducing the pitch of the blades, 2, 2', and in this way prevent undesired operation of the wind motor in a fully automatic manner. Thus, as is indicated by the double arrow 45 in Fig. 6, the structure of Figs. 5 and 6 is capable of automatically turning the valve member 44 back and forth between the position of Fig. 4 to that where the valve member 44 provides communication between conduit portion 46 and conduit portion 43 in order to automatically place the energy storing means 21 into or out of action.

Figure 8:
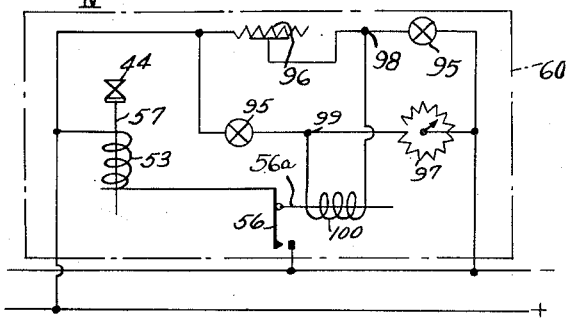
Fig. 8 is a schematic of the voltage regulator incorporated in the circuit shown diagrammatically in Fig. 7.

It is within the purview of the present invention to provide a circuit which controls the opening and closing of the switch 56 of a particular construction suited to the particular conditions under which the wind motor operates. As is shown in Fig. 8 and as will be described below in connection with that figure, a bridge circuit may be provided with an adjustable potentiometer to cause a control relay to operate at a predetermined voltage in order to adapt the charging of the battery to the particular wind conditions under which the battery operates. Thus, by causing such a control relay to close the switch 56 at a relatively high voltage of the battery charge, it is possible to charge the battery fully at one time in areas where the wind is fairly weak and would not suffice to keep a battery near its full charge at all times. On the other hand, such an arrangement may also be adjusted so as to cause a control relay to close the switch 56 when the voltage of the battery charge is relatively low, and thus in areas where there is considerable powerful wind available undesirable gas formation due to quick charging of the battery may be reliably avoided.

Fig. 8 is a schematic of the voltage regulator 60. The same includes a Wheatstone bridge circuit which is connected across the line and which comprises two lamps 95, a pre-set resistor 96, and a variable resistor or potentiometer 97. The coil 100 of a control relay is connected to the points 98 and 99 of the bridge, the point 98 being between one of the lamps 95 and the resistor 96 and the point 99 being between the other lamp 95 and the resistor 97.

Inasmuch as the electrical resistance of lamps increases with increasing current, the equilibrium of the bridge changes in such a manner that when the potential difference between the points 98 and 99 exceeds a certain predetermined set amount, the magnitude of which depends upon the setting of the variable resistor 97, a current will flow through the coil 100. In this way, the armature 56a of the relay is attracted and the switch 56 is closed. As soon as this occurs, a current will flow through the coil 53 of a valve-controlling electromagnet, thereby attracting the armature 57 and opening the valve 44. This allows the oil to flow out of the chamber 38 so that the blades 2, 2' are moved, under the influence of the spring 21, to a pitch at which the rotational speed of the wind wheel decreases, it being assumed that the wind velocity remains constant.

The decreased rotational speed of the wind wheel reduces the voltage and charging capacity of the generator 9, thereby decreasing the rate at which the battery is charged, or even discontinuing the charging entirely. However, as soon as the line voltage drops to a value at which no more current flows through the coil 100, the switch 56, opens, thereby de-energizing the electromagnet 53, 57. This closes the valve 44 so that the chamber 38 is again filled with oil under pressure. This, in turn, causes the spring 21 to be compressed so that the blades assume a pitch at which the speed of the wind wheel is higher. This increases the speed of the generator and consequently the voltage generated thereby, until the desired voltage is attained, whereupon the entire control cycle begins anew.

It will be understood that each of the elements described above, or two or more together, may also find a useful application in other types of wind motors differing from the types described above.

While the invention has been illustrated and described as embodied in control apparatus for wind motors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a wind motor, in combination, support means; a wind wheel turnably carried for rotation about its axis by said support means, said wind wheel including a hub portion and a plurality of blades extending radially from said hub portion and being respectively carried for turning movement about their axes by said hub portion, so that the pitch of said blades can be changed; means operatively connected to said blades and movable in one direction for changing the pitch of said blades in one direction and in an oposite direction for changing the pitch of said blades in an opposite direction; a pair of energy storing means of different strengths operatively connected to said pitch changing means for acting on the same in opposite directions to tend to change the pitch of the blades in opposite directions, respectively; and means driven by said wind wheel during rotation thereof and operatively connected to the stronger of said energy storing means for placing the latter in a position where it has no influence on said pitch changing means.

2. In a wind motor, in combination, support means; a wind wheel turnably carried for rotation about its axis by said support means, said wind wheel including a hub portion and a plurality of blades extending radially from said hub portion and carried for rotation about their axes, respectively, by said hub portion so that the pitch of said blades can be changed; blade pitch changing means operatively connected to said blades and movable in one direction for changing the pitch in one direction and in an opposite direction for changing the blade pitch in an opposite direction; a pair of stressed springs of different strengths acting on said pitch changing means in opposite directions for tending to move said pitch changing means in opposite directions; and means driven by said wind wheel during rotation thereof and operatively connected to the stronger of said springs for placing the latter in a position where it has no influence on the pitch changing means.

3. In a wind motor, in combination, support means; a wind wheel turnably carried for rotation about its axis by said support means, said wind wheel including a hub portion and a plurality of blades turnably carried for rotation about their axes, respectively, by said hub portion, so that the pitch of the blades can be changed; pitch changing means operatively connected to said blades and movable in one direction for changing the pitch in one direction and in an opposite direction for changing the pitch in an opposite direction; a pair of energy storing means of different strengths respectively acting on said pitch changing means in different directions for tending to change the blade pitch in different directions; pump means operatively connected to the wind wheel to be driven thereby during rotation of the wind wheel; and hydraulic means cooperating with said pump means and operatively connected to the stronger of said energy storing means for placing the latter in a position having no influence on the pitch changing means during rotation of the wind wheel.

4. In a wind motor, in combination, support means; a wind wheel turnably carried for rotation about its axis by said support means, said wind wheel including a hub portion and a plurality of blades turnably carried for rotation about their axes, respectively, by said hub portion, so that the pitch of the blades can be changed; pitch changing means operatively connected to said blades and movable in one direction for changing the pitch in one direction and in an opposite direction for changing the pitch in an opposite direction; a pair of energy storing means of different strengths respectively acting on said pitch changing means in different directions for tending to change the blade pitch in different directions; pump means operatively connected to the wind wheel to be driven thereby during rotation of the wind wheel; hydraulic means cooperating with said pump means and operatively connected to the stronger of said energy storing means for placing the latter in a position having no influence on the pitch changing means during rotation of the wind wheel; and control means operatively connected to said hydraulic means and responsive to a plurality of different impulses for eliminating the influence of said hydraulic means on said stronger energy storing means to bring the latter into play during operation of the wind motor.

5. In a wind motor, in combination, support means; a wind wheel turnably carried for rotation about its axis by said support means, said wind wheel including a hub portion and a plurality of blades turnably carried for rotation about their axes, respectively, by said hub portion, so that the pitch of the blades can be changed; pitch changing means operatively connected to said blades and movable in one direction for changing the pitch in one direction and in an opposite direction for changing the pitch in an opposite direction; a pair of energy storing means of different strengths respectively acting on said pitch changing means in different directions for tending to change the blade pitch in different directions; pump means operatively connected to the wind wheel to be driven thereby during rotation of the wind wheel; hydraulic means cooperating with said pump means and operatively connected to the stronger of said energy storing means for placing the latter in a position having no influence on the pitch changing means during rotation of the wind wheel; valve means operatively connected to said hydraulic means and movable between a first position where said hydraulic means acts on said stronger energy storing means to maintain the latter without influence on said pitch changing means and a second position where said hydraulic means frees said stronger energy storing means to act on said pitch changing means during the operation of the wind motor; and means responsive to dynamic pressure of the air acting on the wind wheel operatively connected to said valve means for moving the latter from said first to said second position when the dynamic pressure exceeds a predetermined value.

6. In a wind motor, in combination, support means; a wind wheel turnably carried for rotation about its axis by said support means, said wind wheel including a hub portion and a plurality of blades turnably carried for rotation about their axes, respectively, by said hub portion, so that the pitch of the blades can be changed; pitch changing means operatively connected to said blades and movable in one direction for changing the pitch in one direction and in an opposite direction for changing the pitch in an opposite direction; a pair of energy storing means of different strengths respectively acting on said pitch changing means in different directions for tending to change the blade pitch in different directions; pump means operatively connected to the wind wheel to be driven thereby during rotation of the wind wheel; hydraulic means cooperating with said pump means and operatively connected to the stronger of said energy storing means for placing the latter in a position having no influence on the pitch changing means during rotation of the wind wheel; valve means operatively connected to said hydraulic means and movable between a first position where said hydraulic means acts on said stronger energy storing means to maintain the latter without influence on said pitch changing means and a second position where said hydraulic means frees said stronger energy storing means to act on said pitch changing means during the operation of the wind motor; and electromagnetic means operatively connected to said valve means for moving the latter from said first to said second position thereof when said electromagnetic means is energized.

7. In a wind motor, in combination, support means; a wind wheel turnably carried for rotation about its axis by said support means, said wind wheel including a hub portion and a plurality of blades turnably carried for rotation about their axes, respectively, by said hub portion, so that the pitch of the blades can be changed; pitch changing means operatively connected to said blades and movable in one direction for changing the pitch in one direction and in an opposite direction for changing the pitch in an opposite direction; a pair of energy storing means of different strengths respectively acting on said pitch changing means in different directions for tending to change the blade pitch in different directions; pump means operatively connected to the wind wheel to be driven thereby during rotation of the wind wheel; hydraulic means cooperating with said pump means and operatively connected to the stronger of said energy storing means for placing the latter in a position having no influence on the pitch changing means during rotation of the wind wheel; valve means operatively connected to said hydraulic means and movable between a first position where said hydraulic means acts on said stronger energy storing means to maintain the latter without influence on said pitch changing means and a second position where said hydraulic means frees said stronger energy storing means to act on said pitch changing means during the operation of the wind motor; electromagnetic means operatively connected to said valve means for moving the latter from said first to said second position thereof when said electromagnetic means is energized; a storage battery; a generator for charging said storage battery, said generator being operatively connected to said wind wheel to be driven thereby during rotation thereof; and means electrically interconnecting said storage battery with said electromagnetic means for energizing the latter when the charge of the storage battery reaches a predetermined value.

8. In a wind motor, in combination, support means; a wind wheel turnably carried for rotation about its axis by said support means, said wind wheel including a hub portion and a plurality of blades turnably carried for rotation about their axes, respectively, by said hub portion, so that the pitch of the blades can be changed; pitch changing means operatively connected to said blades and movable in one direction for changing the pitch in one direction and in an opposite direction for changing the pitch in an opposite direction; a pair of energy storing means of different strengths respectively acting on said pitch changing means in different directions for tending to change the blade pitch in different directions; pump means operatively connected to the wind wheel to be driven thereby during rotation of the wind wheel; and hydraulic means cooperating with said pump means and operatively connected to the stronger of said energy storing means for placing the latter in a position having no influence on the pitch changing means during rotation of the wind wheel, said hydraulic means including hydraulic relay for eliminating the influence of the hydraulic means on said stronger energy storing means when the wind wheel stops turning and accelerating the rate at which the influence of said hydraulic means on said stronger energy storing means is eliminated.

9. In a wind motor, in combination, support means; a wind wheel turnably carried for rotation about its axis by said support means, said wind wheel including a hub portion and a plurality of blades turnably carried for rotation about their axes, respectively, by said hub portion, so that the pitch of the blades can be changed; pitch changing means operatively connected to said blades and movable in one direction for changing the pitch in one direction and in an opposite direction for changing the pitch in an opposite direction; a pair of energy storing means of different strengths respectively acting on said pitch changing means in different directions for tending to change the blade pitch in different directions; pump means operatively connected to the wind wheel to be driven thereby during rotation of the wind wheel; hydraulic means cooperating with said pump means and operatively connected to the stronger of said energy storing means for placing the latter in a position having no influence on the pitch changing means during rotation of the wind wheel; a transmission forming part of the wind motor and including an oil bath; and conduit means for conveying the oil of the oil bath to said pump means to be pumped thereby, whereby the oil of the transmission is used in the hydraulic means.

10. In a wind motor, in combination, support means; a wind wheel turnably carried for rotation about its axis by said support means, said wind wheel including a hub portion and a plurality of blades turnably carried for rotation about their axes, respectively, by said hub portion, so that the pitch of the blades can be changed; pitch changing means operatively connected to said blades and movable in one direction for changing the pitch in one direction and in an opposite direction for changing the pitch in an opposite direction; a pair of energy storing means of different strengths respectively acting on said pitch changing means in different directions for tending to change the blade pitch in different directions; pump means operatively connected to the wind wheel to be driven thereby during rotation of the wind wheel; hydraulic means cooperating with said pump means and operatively connected to the stronger of said energy storing means for placing the latter in a position having no influence on the pitch changing means during rotation of the wind wheel; a transmission forming part of the wind motor and including an oil bath; and conduit means for conveying the oil of the oil bath to said pump means to be pumped thereby, whereby the oil of the transmission is used in the hydraulic means, said conduit means having an inlet end in the oil bath located at an elevation which is the lowest permissible elevation for the level of the oil bath in the transmission, so that when the level of the oil bath goes below said elevation oil will no longer be pumped and the influence of the hydraulic means on said stronger energy storing means will automatically terminate.

11. In a wind motor, in combination, support means; a wind wheel turnably carried for rotation about its axis by said support means, said wind wheel including a hub portion and a plurality of blades extending radially from said hub portion and carried for respective turning movement about their axes by said hub portion, so that the pitch of said blades can be changed; pitch changing means operatively connected to said blades and movable in one direction for changing the pitch in one direction and in an opposite direction for changing the pitch in an opposite direction; first spring means operatively connected to said pitch changing means and acting on the same to move said pitch changing means in a direction which changes the pitch of the blades in that direction which enables the blades to take more energy from the air; second spring means acting on said pitch changing means for moving the latter in an opposite direction which changes the pitch in an opposite direction where the blades take a lesser amount of energy out of the air, said second spring means including a piston movable in one direction for removing the influence of said second spring means on said pitch changing means and in an opposite direction for transferring the action of said second spring means to said pitch changing means; pump means driven by said wind wheel when the latter is rotated; and hydraulic means cooperating with said piston and pump means for moving said piston in said one direction to eliminate the influence of said second spring means on said pitch changing means during operation of the wind motor, said hydraulic means including a cylinder in which said piston is slidable in opposite directions and conduit means communicating with said cylinder and said pump means.

12. In a wind rotor, in combination, support means; a wind wheel turnably carried for rotation about its axis by said support means, said wind wheel including a hub portion and a plurality of blades extending radially from said hub portion and carried for respective turning movement about their axes by said hub portion, so that the pitch of said blades can be changed; pitch changing means operatively connected to said blades and movable in one direction for changing the pitch in one direction and in an opposite direction for changing the pitch in an opposite direction; first spring means operatively connected to said pitch changing means and acting on the same to move said pitch changing means in a direction which changes the pitch of the blades in that direction which enables the blades to take more energy from the air; second spring means acting on said pitch changing means for moving the latter in an opposite direction which changes the pitch in an opposite direction where the blades take a lesser amount of energy out of the air, said second spring means including a piston movable in one direction for removing the influence of said second spring means on said pitch changing means and in an opposite direction for transferring the action of said second spring means to said pitch changing means; pump means driven by said wind wheel when the latter is rotated; and hydraulic means cooperating with said piston and pump means for moving said piston in said one direction to eliminate the influence of said second spring means on said pitch changing means during operation of the wind motor, said hydraulic means including a cylinder in which said piston is slidable in opposite directions and conduit means communicating with said cylinder and said pump means, said conduit means including a first conduit portion leading into said cylinder for supplying a fluid under pressure into the latter, a second conduit portion leading away from said cylinder for discharging fluid therefrom, and a third conduit portion leading from said first to said second conduit portion, and said hydraulic means including a hydraulic relay member movable under the influence of fluid under pressure into said third conduit portion for separating said first and second conduit portions from each other, resilient means also forming part of said hydraulic means and acting on said relay member to shift the latter out of said third conduit portion when fluid under pressure is no longer pumped into said hydraulic means to interconnect said first and second conduit portions through said third conduit portion for rapidly eliminating the influence of said hydraulic means on said piston.

13. In a wind motor, in combination, support means; a wind wheel turnably carried for rotation about its axis by said support means, said wind wheel including a hub portion and a plurality of blades extending radially from said hub portion and carried for respective turning movement about their axes by said hub portion, so that the pitch of said blades can be changed; pitch changing means operatively connected to said blades and movable in one direction for changing the pitch in one direction and in an opposite direction for changing the pitch in an opposite direction; first spring means operatively connected to said pitch changing means and acting on the same to move said pitch changing means in a direction which changes the pitch of the blades in that direction which enables the blades to take more energy from the air; second spring means acting on said pitch changing means for moving the latter in an opposite direction which changes the pitch in an opposite direction where the blades take a lesser amount of energy out of the air, said second spring means including a piston movable in one direction for removing the influence of said second spring means on said pitch changing means and in an opposite direction for transferring the action of said second spring means to said pitch changing means; pump means driven by said wind wheel when the latter is rotated; hydraulic means cooperating with said piston and pump means for moving said piston in said one direction to eliminate the influence of said second spring means on said pitch changing means during operation of the wind motor, said hydraulic means including a cylinder in which said piston is slidable in opposite directions and conduit means communicating with said cylinder and said pump means, said conduit means including a first conduit portion leading into said cylinder for supplying a fluid under pressure into the latter, a second conduit portion leading away from said cylinder for discharging fluid therefrom, and a third conduit portion leading from said first to said second conduit portion, and said hydraulic means including a hydraulic relay member movable under the influence of fluid under pressure into said third conduit portion for separating said first and second conduit portions from each other, resilient means also forming part of said hydraulic means and acting on said relay member to shift the latter out of said third conduit portion when fluid under pressure is no longer pumped into said hydraulic means to interconnect said first and second conduit portions through said third conduit portion for rapidly eliminating the influence of said hydraulic means on said piston, said conduit means also including a by-pass conduit portion leading directly from said first to said second conduit portion and by-passing said third conduit portion; and valve means located in the path of fluid flow between said by-pass conduit portion and second conduit portion and having a first position where said by-pass conduit portion is out of communication with said second conduit portion and a second position where said by-pass conduit portion communicates with said second conduit portion.

14. In a wind motor, in combination, support means; a wind wheel turnably carried for rotation about its axis by said support means, said wind wheel including a hub portion and a plurality of blades extending radially from said hub portion and carried for respective turning movement about their axes by said hub portion, so that the pitch of said blades can be changed; pitch changing means operatively connected to said blades and movable in one direction for changing the pitch in one direction and in an opposite direction for changing the pitch in an opposite direction; first spring means operatively connected to said pitch changing means and acting on the same to move said pitch changing means in a direction which changes the pitch of the blades in that direction which enables the blades to take more energy from the air; second spring means acting on said pitch changing means for moving the latter in an opposite direction which changes the pitch in an opposite direction where the blades take a lesser amount of energy out of the air, said second spring means including a piston movable in one direction for removing the influence of said second spring means on said pitch changing means and in an opposite direction for transferring the action of said second spring means to said pitch changing means; pump means driven by said wind wheel when the latter is rotated; hydraulic means cooperating with said piston and pump means for moving said piston in said one direction to eliminate the influence of said second spring means on said pitch changing means during operation of the wind motor, said hydraulic means including a cylinder in which said piston is slidable in opposite directions and conduit means communicating with said cylinder and said pump means, said conduit means including a first conduit portion leading into said cylinder for supplying a fluid under pressure into the latter, a second conduit portion leading away from said cylinder for discharging fluid therefrom, and a third conduit portion leading from said first to said second conduit portion, and said hydraulic means including a hydraulic relay member movable under the influence of fluid under pressure into said third conduit portion for separating said first and second conduit portions from each other, resilient means also forming part of said hydraulic means and acting on said relay member to shift the latter out of said third conduit portion when fluid under pressure is no longer pumped into said hydraulic means to interconnect said first and second conduit portions through said third conduit portion for rapidly eliminating the influence of said hydraulic means on said piston, said conduit means also including a by-pass conduit portion leading directly from said first to said second conduit portion and by-passing said third conduit portion; valve means located in the path of fluid flow between said by-pass conduit portion and second conduit portion and having a first position where said by-pass conduit portion is out of communication with said second conduit portion and a second position where said by-pass conduit portion communicates with said second conduit portion; and means operatively connected to said valve means and responsive to both electro-magnetic and mechanical impulses for moving said valve means from said first to said second position thereof.

15. In a wind motor, in combination, support means; a wind wheel turably carried for rotation about its axis by said support means, said wind wheel including a hub portion and a plurality of blades extending radially from said hub portion and carried for respective turning movement about their axes by said hub portion, so that the pitch of said blades can be changed; pitch changing means operatively connected to said blades and movable in one direction for changing the pitch in one direction and in an opposite direction for changing the pitch in an opposite direction; first spring means operatively connected to said pitch changing means and acting on the same to move said pitch changing means in a direction which changes the pitch of the blades in that direction which enables the blades to take more energy from the air; second spring means acting on said pitch changing means for moving the latter in an opposite direction which changes the pitch in an opposite direction where the blades take a lesser amount of energy out of the air, said second spring means including a piston movable in one direction for removing the influence of said second spring means on said pitch changing means and in an opposite direction for transferring the action of said second spring means to said pitch changing means; pump means driven by said wind wheel when the latter is rotated; hydraulic means cooperating with said piston and pump means for moving said piston in said one direction to eliminate the influence of said second spring means on said pitch changing means during operation of the wind motor, said hydraulic means including a cylinder in which said piston is slidable in opposite directions and conduit means communicating with said cylinder and said pump means; and manually operable moving means operatively connected to said pitch changing means for moving the latter in a direction which changes the pitch of the blades in a direction which causes the blades to take a lesser amount of energy out of the air.

References Cited in the file of this patent

UNITED STATES PATENTS

| | | |
|---|---|---|
| 2,319,592 | Fiedler | May 18, 1943 |
| 2,583,369 | Fumagalli | Jan. 22, 1952 |

FOREIGN PATENTS

| | | |
|---|---|---|
| 888,462 | France | Dec. 14, 1943 |